United States Patent
Har-Tal et al.

(10) Patent No.: US 10,824,803 B2
(45) Date of Patent: Nov. 3, 2020

(54) SYSTEM AND METHOD FOR LOGICAL IDENTIFICATION OF DIFFERENCES BETWEEN SPREADSHEETS

(71) Applicant: DataRails LTD., Rishon LeZion (IL)

(72) Inventors: Oded Har-Tal, Beit Hashmonai (IL); Adam Spiro, Tel Aviv (IL)

(73) Assignee: DataRails LTD., Rishon LeZion (IL)

( * ) Notice: Subject to any disclaimer, the term of this patent is extended or adjusted under 35 U.S.C. 154(b) by 195 days.

(21) Appl. No.: 15/700,921

(22) Filed: Sep. 11, 2017

(65) Prior Publication Data

US 2018/0075006 A1 Mar. 15, 2018

Related U.S. Application Data

(60) Provisional application No. 62/393,129, filed on Sep. 12, 2016.

(51) Int. Cl.
| | |
|---|---|
| *G06F 40/18* | (2020.01) |
| *G06F 40/194* | (2020.01) |
| *G06F 40/197* | (2020.01) |
| *G06F 16/245* | (2019.01) |
| *G06F 16/23* | (2019.01) |
| *G06F 40/103* | (2020.01) |

(52) U.S. Cl.
CPC ........ *G06F 40/197* (2020.01); *G06F 16/2358* (2019.01); *G06F 16/245* (2019.01); *G06F 40/103* (2020.01); *G06F 40/18* (2020.01); *G06F 40/194* (2020.01)

(58) Field of Classification Search
CPC .......................... G06F 17/2288; G06F 17/246
See application file for complete search history.

(56) References Cited

U.S. PATENT DOCUMENTS

| | | | | |
|---|---|---|---|---|
| 5,806,078 | A * | 9/1998 | Hug | G06F 40/197 715/205 |
| 8,381,095 | B1 * | 2/2013 | Fischer | G06F 40/177 715/234 |
| 8,601,383 | B2 | 12/2013 | Folting et al. | |
| 9,275,031 | B2 | 3/2016 | Dickerman et al. | |
| 9,305,176 | B2 | 4/2016 | Gloski et al. | |
| 10,255,338 | B2 * | 4/2019 | Romano | G06F 16/254 |
| 2005/0138540 | A1 * | 6/2005 | Baltus | G06F 40/194 715/229 |
| 2007/0011211 | A1 | 1/2007 | Reeves et al. | |

(Continued)

*Primary Examiner* — Scott T Baderman
*Assistant Examiner* — Mario M Velez-Lopez
(74) *Attorney, Agent, or Firm* — M&B IP Analysts, LLC

(57) ABSTRACT

A method and system for logical comparison of different versions of a spreadsheet are provided. The method includes identifying, in each of a first version and a second version of the spreadsheet, data and metadata associated with their respective headers; comparing between the first version and the second version of the spreadsheet to identify at least one structural difference, wherein the comparison is based on the identified headers data and metadata; comparing between the first version and the second version of the spreadsheet to identify at least one content value difference, wherein the comparison is based, in part, on the at least one identified structural difference; and saving the at least one identified structural difference and the at least one identified content value difference in a differences (Diff) dataset.

19 Claims, 2 Drawing Sheets

(56) References Cited

U.S. PATENT DOCUMENTS

| | | |
|---|---|---|
| 2009/0327851 A1 | 12/2009 | Raposo |
| 2010/0174678 A1* | 7/2010 | Massand ............... G06F 40/194 |
| | | 707/610 |
| 2013/0145244 A1 | 6/2013 | Rothschiller et al. |
| 2015/0269146 A1* | 9/2015 | Ayyar .................. G06Q 10/101 |
| | | 707/608 |
| 2015/0309967 A1 | 10/2015 | Presler-Marshall et al. |
| 2015/0309979 A1 | 10/2015 | Presler-Marshall et al. |
| 2018/0189369 A1* | 7/2018 | Baek ....................... G06F 16/27 |

* cited by examiner

SYSTEM AND METHOD FOR LOGICAL IDENTIFICATION OF DIFFERENCES BETWEEN SPREADSHEETS

CROSS-REFERENCE TO RELATED APPLICATIONS

This application claims the benefit of U.S. Provisional Application No. 62/393,129 filed on Sep. 12, 2016, the contents of which are hereby incorporated by reference.

TECHNICAL FIELD

The present disclosure relates generally to spreadsheet analysis, and more particularly to logical identification of differences between spreadsheets.

BACKGROUND

Spreadsheets are interactive computer application programs for organization, analysis, and storage of data in tabular form. Spreadsheets are developed as computerized simulations of paper accounting worksheets. The program operates on data represented as cells of an array, organized in rows and columns. Each cell of the array is a model-view-controller element that may contain either numeric or text data, or the results of formulas that automatically calculate and display a value based on the contents of other cells.

Spreadsheets are easy to modify. Changes can be made in a spreadsheet by changing its structure, changing data without modifying the structure, or changing the structure and the data. For example, changing the structure may include adding rows, columns, and/or changing cells' locations. The data changes may include changing values in particular cells. Currently, changes are tracked by saving a copy of a spreadsheet as different file versions.

As such, tracking the changes and identifying the differences among different files (of different spreadsheet versions) is a more complicated task. As an example, comparing spreadsheets having thousands of cells manually by a user is an impossible task. The time that would be required for such comparison could be days, and still there is no assurance that all differences can be tracked, and specifically the cause for such differences.

Currently available computer application programs are very limited in their performance and do not provide for an accurate representation of such changes. For example, the compare tool by Excel® is limited to comparing tables having the same structure. Thus, if a cell (e.g., carry value calculated by a certain formula) is moved to a different location, such change would not be identified. The cells' values cells would be marked as deleted even when cells' values have been moved, for example, one column right. Further, the compare tool by Excel® is limited to compare only between two files.

In addition, utilization of computing resources, such as CPU time, storage, and memory required for comparing the spreadsheets is very high. As such, in many cases, the comparison of spreadsheets run, for example, a personal computer (PC) may not be a feasible task or would take a long time to complete. For example, to open a large Excel® file (e.g., 1 GB) would take a few hours on a standard PC. Further, comparing Excel® files (or even just changing such files) would maximize the memory and CPU utilization of a PC. In addition, current tools allow comparisons between two versions of files. As such, all files versions should be stored which requires storage device with high capacity.

It would be therefore advantageous to provide a solution that overcomes the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

The embodiments disclosed herein include a method for logical comparison of different versions of a spreadsheet. The method comprises identifying, in each of a first version and a second version of the spreadsheet, data and metadata associated with their respective headers; comparing between the first version and the second version of the spreadsheet to identify at least one structural difference, wherein the comparison is based on the identified headers data and metadata; comparing between the first version and the second version of the spreadsheet to identify at least one content value difference, wherein the comparison is based, in part, on the at least one identified structural difference; and saving the at least one identified structural difference and the at least one identified content value difference in a differences (Diff) dataset.

The embodiments disclosed herein also include a system for logical comparison of different versions of a spreadsheet. The system comprises a processing circuitry; and a memory, the memory containing instructions that, when executed by the processing circuitry, configure the system to: identify, in each of a first version and a second version of the spreadsheet, data and metadata associated with their respective headers; compare between the first version and the second version of the spreadsheet to identify at least one structural difference, wherein the comparison is based on the identified headers data and metadata; compare between the first version and the second version of the spreadsheet to identify at least one content value difference, wherein the comparison is based, in part, on the at least one identified structural difference; and save the at least one identified structural difference and the at least one identified content value difference in a differences (Diff) dataset.

BRIEF DESCRIPTION OF THE DRAWINGS

The subject matter that is regarded as the disclosure is particularly pointed out and distinctly claimed in the claims at the conclusion of the specification. The foregoing and other objects, features, and advantages of the disclosure will be apparent from the following detailed description taken in conjunction with the accompanying drawings.

DETAILED DESCRIPTION

Figure 1:
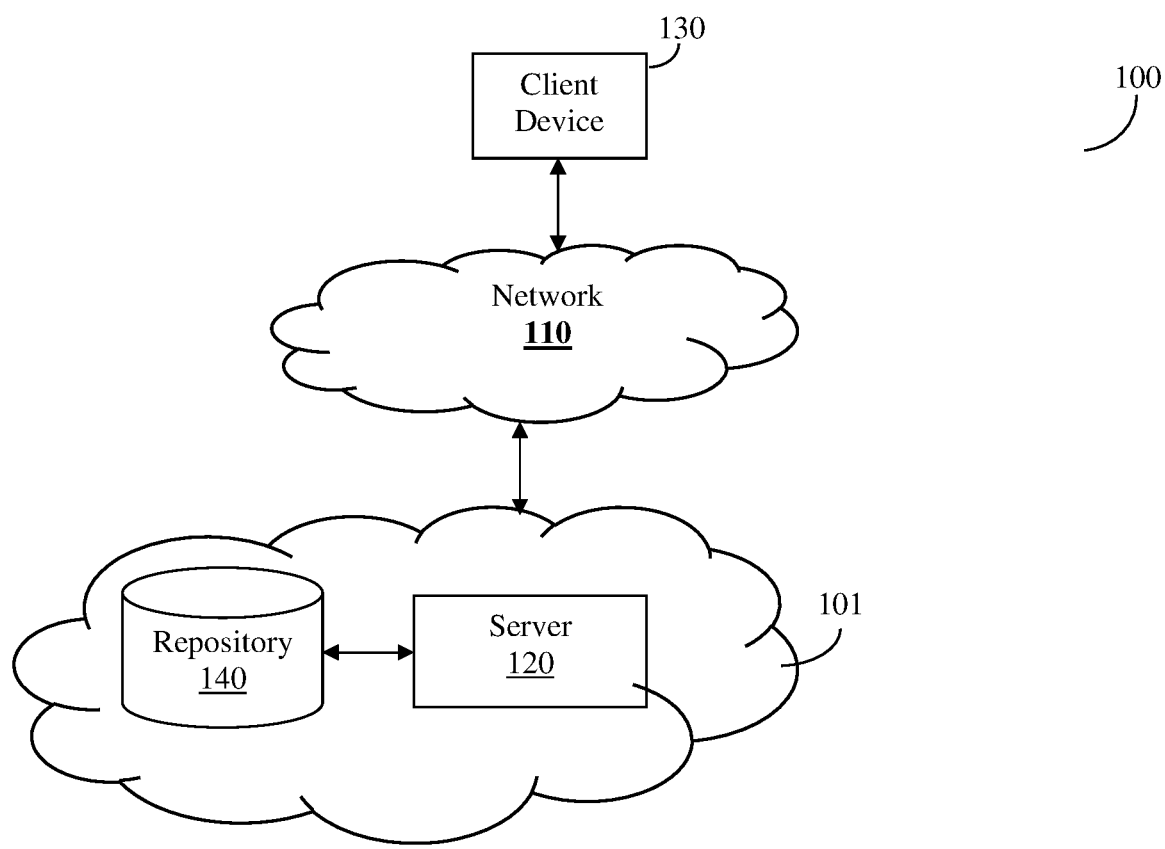
FIG. 1 is a schematic diagram of a system for logical identification of differences between spreadsheets according to an embodiment.

It is important to note that the embodiments disclosed herein are only examples of the many advantageous uses of the teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality. In the drawings, like numerals refer to like parts through several views.

According to some example embodiments, a method and system for logical identification of differences between spreadsheets is provided. The system is configured to compare between two consecutive versions of a spreadsheet (e.g., a first and a second spreadsheet), by tracking changes across multiple versions of a spreadsheet (consecutive and non-consecutive). In an embodiment, the logical differences resulting from comparison of two consecutive versions are saved in a difference dataset (hereinafter a "Diff dataset"). The tracking across the different versions of the spreadsheet can be performed by simply querying of the Diff dataset, without a comparison of the versions. For example, the logical difference between version 1 and version 27 of the spreadsheet can be retrieved from the Diff dataset using a simple single query, rather than by making 26 comparisons between the different versions of the spreadsheet.

Thus, the disclosed techniques may provide technical improvements such as, but not limited to, lower memory and CPU utilization (since not all files are compared when tracking changes), and less storage space (since, when using the Diff dataset, only one version of the spreadsheet needs to be saved). Further, the time required to identify differences between different versions is relatively low, as again, the differences are retrieved from the database.

Other than the technical improvements provided by the disclosed system and method, the logical differences identified through the comparison includes changes in the structure and values in the spreadsheet. For example, logical differences may be indicated when moving a cell or an entire table, modifying a table, changing values in cells, utilization of different formulas, and so on. The logical differences may also be indicative of formatting changes, such as font, text, color, of a cell or table.

A spreadsheet, as discussed in the context of the disclosed embodiments, may be an interactive computer application programs for organization, analysis and storage of data in tabular form. The program operates on data represented as cells of an array, organized in rows and columns. Each cell of the array is a model-view-controller element that may contain either numeric or text data, or the results of formulas that automatically calculate and display a value based on the contents of other cells. A spreadsheet typically includes headers including data and metadata, and content values related to the headers.

In an example embodiment, analyze two consecutive versions of a spreadsheet are analyzed to identify the data and the metadata respective of the headers. The identified data and metadata of a first version is compared to the data and metadata of a second version, and similar headers and dissimilar headers associated with the first and the second versions are identified. The locations of the headers and their associated values are determined by the system. Thereafter, the system is configured to compare the content values in the first version to values appearing in the respective locations of the second version to determine the differences between the values respective thereof.

That is, the logical differences are identified by first detecting structural changes, and then detecting changes in the values in the spreadsheet. The changed values may be traced to the logical changes or not. The changes in the values may be detected by identifying corresponding values based on the structural changes and determining differences between the corresponding values.

FIG. 1 is an example diagram of a networked diagram 100 utilized to describe the various embodiment for comparing versions of a spreadsheet and identifying logical differences respective thereof.

The various embodiments may be performed by a server 120 operable in a cloud computing platform 101. The server 120 may be a physical machine, a virtual machine, or any combination thereof. In an embodiment, the server is a computer hardware and software component configured to execute predetermined computing tasks. The server 120 includes a processing circuitry, and a memory (both not shown). The memory contains therein instructions that, when executed by the processing circuitry, configures the server 120 to execute the various tasks disclosed herein.

In an embodiment, the platform 101 further includes a data repository 140 utilized to store (temporary or permanently) spreadsheet files uploaded by users, e.g., using a client device 130. The repository 140 may be, for example, a database, a data warehouse, and the like. The cloud computing platform 101 may be a public cloud, a provide cloud, or a hybrid cloud.

The client device 130 communicates with the cloud computing platform 110 over a network 110. The network 110 may be the Internet, the world-wide-web (WWW), a local area network (LAN), a wide area network (WAN), a metro area network (MAN), and other networks capable of enabling communication between the elements of the system 100. The client device 130 may be for example, a smart phone, a mobile phone, a laptop, a tablet computer, a wearable computing device, a personal computer (PC), a smart television and the like.

According to the embodiments disclosed, the server 120 may be configured to receive a first version and a second version of a spreadsheet uploaded from the client device 130. According to one embodiment, the spreadsheet's versions may be received, or may be collected from another source such as for example database, cloud database, website, and the like.

In an embodiment, the first spreadsheet version is generated (or modified) before the second version. Each of the first and second spreadsheet versions includes multiple cells organized in at least a two-dimensional array. The spreadsheet versions may include headers having data and metadata as well as content values. The content values include data and metadata, related to the headers.

The data may include a letter, a word, a number, a character, a formula, a combination thereof, and so on. The metadata may include a text font, a text size, a number formatting, a border, header's cell's location, text color, cells' structure, cells' reference, a combination thereof and so on. The metadata associated with the cells' structure may indicate, for example, on a group of six cells bounded by a thick border, divided to two rows and three columns, and so on.

The metadata associated with the cells' structure may be, for example, a cell including a certain formula that refers to 27 other cells. The metadata of the cells may be recursive.

That is, in case a first group of cells is identified, a second group of cells related to the first group of cells may be identified, thus, other cells related to the second group of cells can be identified, and so on and so forth.

For example, the word "month" in a cell number (A1) may represent the data of the header located above 12 cells, having metadata that may be indicative of the text size, font's type, text color, cell's location, and so on. According to the same example, the content values may be represented by the information located within the 12 cells located beneath the header represented by the word "month". For example, the content value of cell number (A2) may be "January", the content value of cell number (A3) may be "February", the content value of cell number (A13) may be "December". It should be noted that the letters represent columns in the spreadsheet and the digits represent the row number.

In an embodiment, the server 120 is configured to analyze the first and second spreadsheet versions to identify the data and the metadata associated with of headers of these versions. The analysis may include comparing the data and the metadata associated with the cells located in the first and second spreadsheet versions to data and metadata of a plurality of other spreadsheets stored within the repository 140.

The server 120 is configured to compare the data associated with the headers of the first version to the data associated with the headers of the second version. The server 120 is further configured to compare the metadata associated with headers of the first version to the metadata associated with the headers of the second spreadsheet.

For example, data such as the word "employees" included within one header located in a first spreadsheet may be compared to data such as the word "employees" included within a header located in a second spreadsheet. According to the same example, metadata associated with the header represented by the word "employees" located within the first spreadsheet, may be compared to metadata associated with the header represented by the word "employees" located within the second spreadsheet. The metadata may indicate, for example, that the header "employees" of the first spreadsheet is located within cell number (D1) and that the header "employees" of the second spreadsheet located within cell number (D4).

In an embodiment, the server 120 is also configured to identify, based on the comparison of the data and the metadata, similar headers and dissimilar headers associated with the first spreadsheet and with the at least a second spreadsheet. The similar and dissimilar headers may be identified based on the identification of several elements related to the data and the metadata that may be predetermined. For example, similar headers' text color, similar headers' font type, and so on.

As a non-limiting example, the server 120 may identify, in two spreadsheets, two headers that include the word "January", the header of the first spreadsheet having metadata that indicates that the cell number is (B1), the font type is "Arial" and that the text color is green. According to the same example, the second header, which also include the word "January," includes metadata that indicates that the cell number at which the header is located is (H1), that the font type is "Arial" and that the text color is green as well. According to this example, the headers will be classified as similar headers.

In an embodiment, the server 120 may identify data and metadata that indicates that some headers are dissimilar. For example, one header associated with a first spreadsheet includes the word "expenses" as the server 120 identifies a header located within a second spreadsheet that includes the word "incomes".

The server 120 is configured to determine, based on the identification of the similar headers and dissimilar headers, the location of the similar headers and the dissimilar headers in the first spreadsheet and in the at least a second spreadsheet. For example, after identification of two headers located in two different spreadsheets that include the title "January", the server 120 may determine the location of the headers within the two spreadsheet versions. According to the same example, the server 120 may determine that the header located in the first spreadsheet was stored in cell number (A1) and the header located in the second spreadsheet was stored in cell number (C8).

Then, based on the determination of the location of the similar and dissimilar headers, the server 120 is configured to identify the location of the content values associated with the similar and dissimilar headers of the first spreadsheet and the at least a second spreadsheet. For example, upon identification of the location of two similar headers located in two different spreadsheets, the server 120 is configured to identify the location of content values associated with the two similar headers. According to the same example, a header located in cell number (A1) may indicate the location of the content values located, for example, in cells (A2), (A3), (A4), etc.

Then, based on the identification of the location of the content values, the server 120 may be configured to compare the content values associated with the similar headers of the first spreadsheet to the content values associated with the corresponding similar headers of the at least a second spreadsheet. For example, the number "30" is stored in cell number (B2) beneath the header "expenses" stored in cell number (B1) of the first spreadsheet, and a similar header named "expenses" is identified in cell number (D1) in a second spreadsheet located above cell number (D2) which comprises the number "40". According to the same example, the server 120 may be configured to compare the number "30" located in the first spreadsheet, to the number "40" located in the second spreadsheet.

Then, respective of the comparison, the server 120 is configured to determine the differences between the data and the metadata associated with the content values of the first spreadsheet and the data and the metadata associated with the content values of the at least a second spreadsheet. That is, the server 120 may determine if more content values were added, removed, or moved to different locations within the spreadsheet.

In an embodiment, the server 120 may display the differences between the data and the metadata of the content values of the first spreadsheet and the data and the metadata of the content values of the at least a second spreadsheet on a user interface (not shown) of the client device 130. According to another embodiment, the server 120 may send a notification to the client device 130 with respect to identification of changes made in at least one of the first spreadsheet and the at least a second spreadsheet.

In an embodiment, the server 120 is configured to update a Diff dataset with the identified difference. The Diff dataset may include, but is not limited to, a file, entries stored in a database, and the like. The Diff dataset may designate, per cell, any identified changes with respect to any version (not necessarily only the immediately preceding version). For example, if the version "01" is compared with the version "02," the Diff dataset may include the identified differences between these versions. If a later version "03" is compared to the version "02," the difference between version "03" and versions "02" and "01," respectively, would be included in the Diff dataset. In an embodiment, the differences, per cell, across consecutive and nonconsecutive are tracked by assigning a logical ID for each cell.

In some implementations, the Diff dataset may be queried for changes between versions of the spreadsheet. Further, the Diff dataset may be queried for changes between non-consecutive versions of the spreadsheet that were not previously identified. When such a query is received, the server 120 is configured to determine the changes between the non-consecutive versions of the spreadsheet by aggregating changes across the non-consecutive versions and any intervening versions. For example, if the Diff dataset is queried for the differences between a second version of the spreadsheet and a fifth version of the spreadsheet, the server 120 is configured to aggregate the differences between the second and third version, the third and fourth version, and the fourth and fifth version, respectively, wherein the aggregate difference is the difference between the second and fifth version.

It should be noted that a single client device 130, a single cloud computing platform 101 including one repository 140, and one server 120 are shown in FIG. 1 merely for simplicity purposes and without limitation on the disclosed embodiments.

Figure 2:
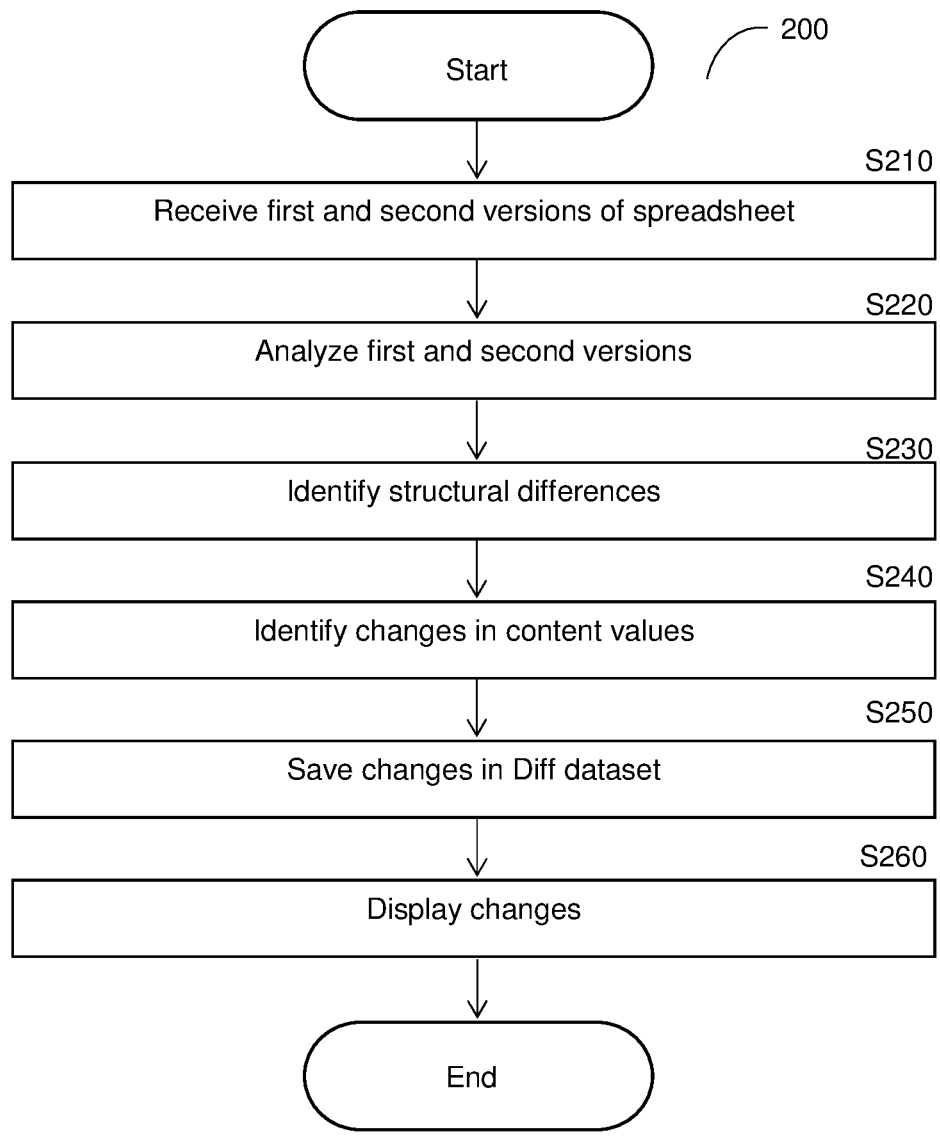
FIG. 2 is a flowchart illustrating the operation of a method for logical identification of differences between spreadsheets according to an embodiment.

FIG. 2 depicts an example flowchart 200 illustrating a method 200 for comparing and identifying differences between spreadsheets according to an embodiment.

At S210, a first version and a second version of a spreadsheet are received. In an example embodiment, the first and second versions are consecutive versions, that is, the first version was created or modified before the second version. It should be noted that each such version is a spreadsheet file. As noted above, a spreadsheet file includes a plurality of cells organized in at least a two-dimensional array. A cell is defined by a header comprising header's data and metadata. The cell contains a value having data and metadata related to the header. The data includes a string, a number, a formula, and so on. Metadata of a cell relates to its formatting, e.g., a text font, a text size, header's cell's location, text color, border, cells' structure, cells' reference, and so on.

At S220, the first and second versions of the spreadsheet are analyzed to identify the data and the metadata associated with headers in each spreadsheet version.

At S230, the first and second versions of the spreadsheet are compared to each other to identify any structural differences. That is, any changes in the locations of the cells, modifications to a structure of a table, and so on. In an embodiment, S230 includes comparing between headers data as identified in both versions of the spreadsheet. Then, comparing between headers data as identified in both versions in the spreadsheet.

The comparison of the headers data and metadata may result in similar headers and dissimilar headers in the first and second versions of the spreadsheet. Then, based on the locations of the similar and dissimilar headers, any changes in the structure of the spreadsheet are determined.

At S240, any changes in the content values are identified. Specifically, changes in content values associated with the similar and dissimilar headers are identified. In an embodiment, S240 includes identifying the new locations of cells associated with dissimilar headers. Further, the current locations of cells associated with dissimilar headers are determined. Then, based on the identified locations of cells, each two corresponding matching cells are compared to identify and difference in their content values. The comparison is performed to determine changes in the data (actual value) and metadata (formatting). Some examples are provided above.

At S250, the identified structural and content changes are saved in the Diff dataset associated with the spreadsheet. It should be noted that if a new version (third version) of the spreadsheet is received, that version would be compared to the second version and also saved in the Diff datasets. Thus, the Diff dataset includes all changes across different versions. The Diff dataset may be stored in the repository 140.

At S260, the identified changes are displayed to a user. The changes may be displayed on either on the first or second version while noting current and previous value, or by creating a new version with the changes.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for logical comparison of different versions of a spreadsheet, comprising:
    identifying, in each of a first version and a second version of the spreadsheet, data and metadata associated with their respective headers;
    comparing between the first version and the second version of the spreadsheet to identify at least one structural difference, wherein the comparison is based on the identified headers data and metadata;
    comparing between the first version and the second version of the spreadsheet to identify at least one content value difference, wherein the comparison is based, in part, on the at least one identified structural difference;
    saving the at least one identified structural difference and the at least one identified content value difference in a differences (Diff) dataset;
    comparing a third version of the spreadsheet to the second version;
    saving any structural differences and content value differences identified based on the comparison of the third version and the second version in the Diff dataset, wherein the Diff dataset contains changes across a plurality of different versions of the spreadsheet; and
    indirectly comparing two versions of the spreadsheet to determine differences between the two versions, wherein the indirect comparison includes querying the Diff dataset for the changes across the two versions and any intervening versions, wherein the differences between the two versions are determined based on aggregate changes across the two versions and any intervening versions.

2. The method of claim 1, wherein the first, second, and third versions are consecutive versions, wherein each version is a spreadsheet file.

3. The method of claim 1, wherein comparing between the first version and the second version of the spreadsheet to identify structural differences further comprises:
    identifying, using the headers data and metadata, similar and dissimilar headers between the first version and the second version; and
    identifying current locations of similar headers and new locations of dissimilar headers.

4. The method of claim 3, further comprising:
    comparing headers data of the first version to headers data of the second version; and
    comparing headers metadata of the first version to headers metadata of the second version, wherein the similar and dissimilar headers are identified based on the comparison of headers data and the comparison of headers metadata.

5. The method of claim 3, wherein each structural difference includes at least one of: a difference in borders, a difference in cell size of at least two cells, a difference in rows, a difference in columns, and at least one shift of between a table of the first spreadsheet and a table of the second spreadsheet.

6. The method of claim 3, wherein comparing between the first version and the second version of the spreadsheet to identify at least one content value difference further comprises:
    identifying changes in content values associated with the similar headers and dissimilar headers.

7. The method of claim 6, further comprising:
    comparing each set of two corresponding cells in the first version and second version to identify a content value difference, wherein each set of two corresponding cells is determined based on the respective locations of the cells.

8. The method of claim 7, wherein the content value difference includes at least one of: a data value difference, and a content value difference.

9. The method of claim 1, further comprising:
    displaying the structural difference and content value difference identified based on the comparison on any one of: the first version and the second version.

10. A non-transitory computer readable medium having stored thereon instructions for causing a processing circuitry to execute a process, the process comprising:
    identifying, in each of a first version and a second version of the spreadsheet, data and metadata associated with their respective headers;
    comparing between the first version and the second version of the spreadsheet to identify at least one structural difference, wherein the comparison is based on the identified headers data and metadata;
    comparing between the first version and the second version of the spreadsheet to identify at least one content value difference, wherein the comparison is based, in part, on the at least one identified structural difference;
    saving the at least one identified structural difference and the at least one identified content value difference in a differences (Diff) dataset;
    comparing a third version of the spreadsheet to the second version;
    saving any structural differences and content value differences identified based on the comparison of the third version and the second version in the Diff dataset, wherein the Diff dataset contains changes across a plurality of different versions of the spreadsheet; and
    indirectly comparing two versions of the spreadsheet to determine differences between the two versions, wherein the indirect comparison includes querying the Diff dataset for the changes across the two versions and any intervening versions, wherein the differences between the two versions are determined based on aggregate changes across the two versions and any intervening versions.

11. A system for logical comparison of different versions of a spreadsheet, comprising:
    a processing circuitry; and
    a memory, the memory containing instructions that, when executed by the processing circuitry, configure the system to:
    identify, in each of a first version and a second version of the spreadsheet, data and metadata associated with their respective headers;
    compare between the first version and the second version of the spreadsheet to identify at least one structural difference, wherein the comparison is based on the identified headers data and metadata;
    compare between the first version and the second version of the spreadsheet to identify at least one content value difference, wherein the comparison is based, in part, on the at least one identified structural difference;
    save the at least one identified structural difference and the at least one identified content value difference in a differences (Diff) dataset;
    compare a third version of the spreadsheet to the second version;

save any structural differences and content value differences identified based on the comparison of the third version and the second version in the Diff dataset, wherein the Diff dataset contains changes across a plurality of different versions of the spreadsheet; and indirectly compare two versions of the spreadsheet to determine differences between the two versions, wherein the indirect comparison includes querying the Diff dataset for the changes across the two versions and any intervening versions, wherein the differences between the two versions are determined based on aggregate changes across the two versions and any intervening versions.

12. The system of claim 11, wherein the first, second, and third versions are consecutive versions, wherein each version is a spreadsheet file.

13. The system of claim 11, wherein the system is further configured to:
identify, using the headers data and metadata, similar and dissimilar headers between the first version and the second version; and
identify current locations of similar headers and new locations of dissimilar headers.

14. The system of claim 13, wherein the system is further configured to:
compare headers data of the first version to headers data of the second version; and
compare headers metadata of the first version to headers metadata of the second version, wherein the similar and dissimilar headers are identified based on the comparison of headers data and the comparison of headers metadata.

15. The system of claim 13, wherein each structural difference includes at least one of: a difference in borders, a difference in cell size of at least two cells, a difference in rows, a difference in columns, and at least one shift of between a table of the first spreadsheet and a table of the second spreadsheet.

16. The system of claim 13, wherein the system is further configured to:
identify changes in content values associated with the similar headers and dissimilar headers.

17. The system of claim 16, wherein the system is further configured to:
compare each set of two corresponding cells in the first version and second version to identify a content value difference, wherein each set of two corresponding cells is determined based on the respective locations of the cells.

18. The system of claim 17, wherein the content value difference includes at least one of: a data value difference, and a content value difference.

19. The system of claim 11, wherein the system is further configured to:
display on structural difference and content value difference identified based on the comparison on any one of: the first version and the second version.

* * * * *